US012188271B2

(12) United States Patent
Reichbach

(10) Patent No.: US 12,188,271 B2
(45) Date of Patent: Jan. 7, 2025

(54) DOOR HOLDER ASSEMBLY

(71) Applicant: Q ALPHA, INC., Raleigh, NC (US)

(72) Inventor: Milan Blair Reichbach, Raleigh, NC (US)

(73) Assignee: ALPHA, INC., Raleigh, NC (US)

( * ) Notice: Subject to any disclaimer, the term of this patent is extended or adjusted under 35 U.S.C. 154(b) by 0 days.

(21) Appl. No.: 17/974,835

(22) Filed: Oct. 27, 2022

(65) Prior Publication Data

US 2023/0140013 A1 May 4, 2023

Related U.S. Application Data

(60) Provisional application No. 63/272,840, filed on Oct. 28, 2021.

(51) Int. Cl.
*E05F 5/02* (2006.01)
*E05C 17/00* (2006.01)

(52) U.S. Cl.
CPC .................................. *E05C 17/025* (2013.01)

(58) Field of Classification Search
CPC .......... E05C 17/00; E05C 17/46; E05C 17/54; E05C 17/44; E05C 17/025; E05F 5/02; E05F 5/06; E05F 5/08; E05F 5/18; E05F 5/00; E05Y 2900/132; E05Y 2201/212; E05Y 2201/224; E05Y 2201/246; E05Y 2201/266; E05Y 2201/484
See application file for complete search history.

(56) References Cited

U.S. PATENT DOCUMENTS

| | | | | |
|---|---|---|---|---|
| 1,803,610 | A | 5/1931 | Greene | |
| D209,812 | S | 1/1968 | Biro | |
| D229,028 | S | 11/1973 | Mestre | |
| D303,625 | S | 9/1989 | Ryser | |
| D353,533 | S | 12/1994 | Lee | |
| D620,348 | S | 7/2010 | Leung | |
| 7,904,992 | B2 * | 3/2011 | Agster | E05D 11/00 16/374 |
| 9,399,881 | B1 | 7/2016 | Fortmann | |
| 10,801,238 | B1 * | 10/2020 | Cox | E05C 17/025 |
| 2007/0126248 | A1 * | 6/2007 | Mintz | E05C 17/025 292/342 |
| 2008/0079270 | A1 * | 4/2008 | Carlson | E05C 17/025 292/343 |
| 2009/0260182 | A1 * | 10/2009 | Hall | E05C 17/025 16/82 |
| 2010/0242226 | A1 * | 9/2010 | Hopkins | E05C 17/54 16/82 |
| 2014/0182341 | A1 | 7/2014 | Orlov | |

(Continued)

FOREIGN PATENT DOCUMENTS

FR 2677398 A3 * 12/1992 ........... E05C 17/025

OTHER PUBLICATIONS

Notice of Allowance issued in corresponding U.S. Appl. No. 29/837,447 on Jul. 5, 2024.

*Primary Examiner* — Chuck Y Mah
(74) *Attorney, Agent, or Firm* — Volpe Koenig

(57) ABSTRACT

A door holding device is disclosed herein. The device includes a first hinge engagement region and a second hinge engagement region. At least one of the first or second hinge engagement regions includes at least one magnetic element and the device is configured to hold a door in an open state when the at least one magnetic element engages a door hinge plate.

17 Claims, 10 Drawing Sheets

(56) References Cited

U.S. PATENT DOCUMENTS

| | | | | |
|---|---|---|---|---|
| 2014/0183883 | A1* | 7/2014 | Millsap | E05C 17/54<br>292/288 |
| 2014/0225385 | A1* | 8/2014 | Millsap | E05C 17/025<br>292/288 |
| 2016/0145914 | A1* | 5/2016 | Fuentes | E05C 17/56<br>16/82 |
| 2017/0226782 | A1* | 8/2017 | Holden | E05C 17/54 |
| 2018/0128025 | A1* | 5/2018 | Estrada | E05C 17/56 |
| 2022/0251889 | A1* | 8/2022 | Hermann | E05C 17/025 |
| 2023/0140013 | A1 | 5/2023 | Reichbach | |
| 2023/0184013 | A1 | 6/2023 | Yang | |

* cited by examiner

DOOR HOLDER ASSEMBLY

CROSS REFERENCE TO RELATED APPLICATION

This application claims priority to U.S. Provisional Patent Application No. 63/272,840, filed on Oct. 28, 2021, the contents of which are incorporated herein by reference as if fully set forth.

FIELD OF INVENTION

This application relates to a door accessory, and more specifically relates to a door holder.

BACKGROUND OF THE INVENTION

Various types of devices are known for holding doors open or in a fixed position. For example, many different types of wedges are available that require a user to push the wedge into engagement with the bottom surface of the door and the ground. Other types of door holders can include a wall-mounted hook assembly that engages a corresponding loop or holder mounted to a surface of the door.

These known types of door holders are often either difficult to install or unreliable at continuously holding the door in a fixed position due to strength capacity issues.

SUMMARY OF THE INVENTION

An improved door holding device is disclosed herein. The device includes a first hinge engagement region and a second hinge engagement region. At least one of the first or second hinge engagement regions includes at least one magnetic element and the device is configured to hold a door in an open state when the at least one magnetic element engages with a door hinge plate. One portion or surface of the device can be configured to engage against a portion of a door frame or structure, such as a door jamb.

In one aspect, the device further includes a handle extending away from the first and second hinge engagement regions. The handle can have a circular profile, in one aspect. A length of the handle can be greater than a length of the first hinge engagement region and a length of the second hinge engagement region, in one aspect.

The first and second hinge engagement regions can be oriented 70 degrees-110 degrees from each other. In one aspect, the first and second hinge engagement regions are oriented approximately 90 degrees from each other.

The first and second magnetic elements can be formed as neodymium magnets. In one aspect, the first and second magnetic elements protrude from the first and second hinge engagement regions. In another aspect, the first and second magnetic elements are recessed from an outer surface of the first and second hinge engagement regions. The magnetic elements can be inserted into the relevant portions of the device via slots formed on side surfaces of the first and second hinge engagement regions.

The device can be formed from plastic, in one aspect. In another aspect, the device is formed from wood, metal, or other material.

Adjustment features can be implemented throughout the device. For example, the device can further comprise at least one adjustment feature configured to change a length or orientation of one portion of the device relative to another. A length of at least one of the first or second hinge engagement regions can also be adjustable. In one aspect, an angle between the first and second hinge engagement regions is adjustable. This allows the device to be used in door frames of varying profiles, geometries, shapes, sizes, etc.

Additional embodiments, variations and aspects are disclosed herein.

BRIEF DESCRIPTION OF THE DRAWINGS

The foregoing Summary and the following Detailed Description will be better understood when read in conjunction with the appended drawings, which illustrate a preferred embodiment of the invention. In the drawings.

DETAILED DESCRIPTION OF PREFERRED EMBODIMENTS

Figure 1:
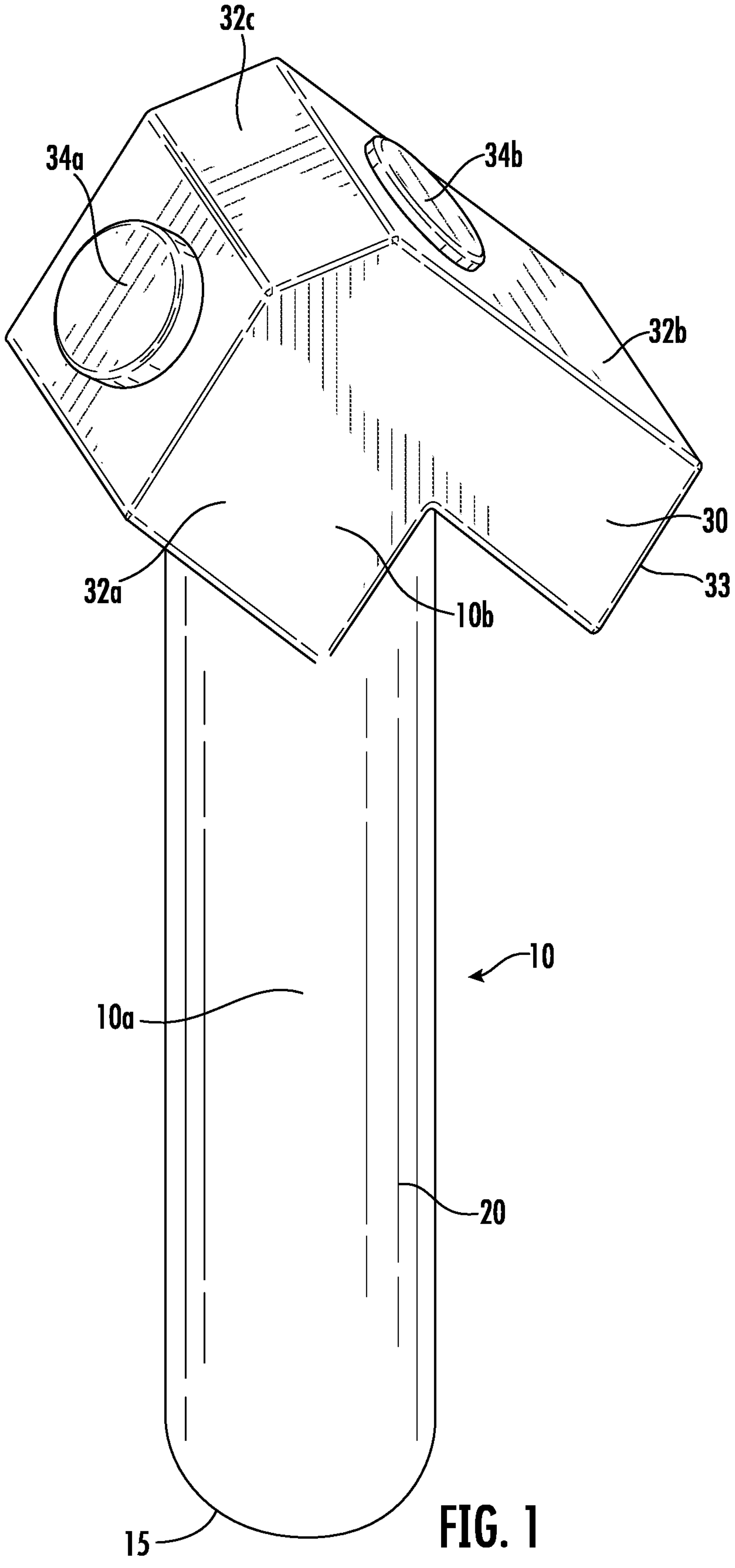
FIG. 1 is a perspective view of a door holding device according to one aspect.
Figure 2:
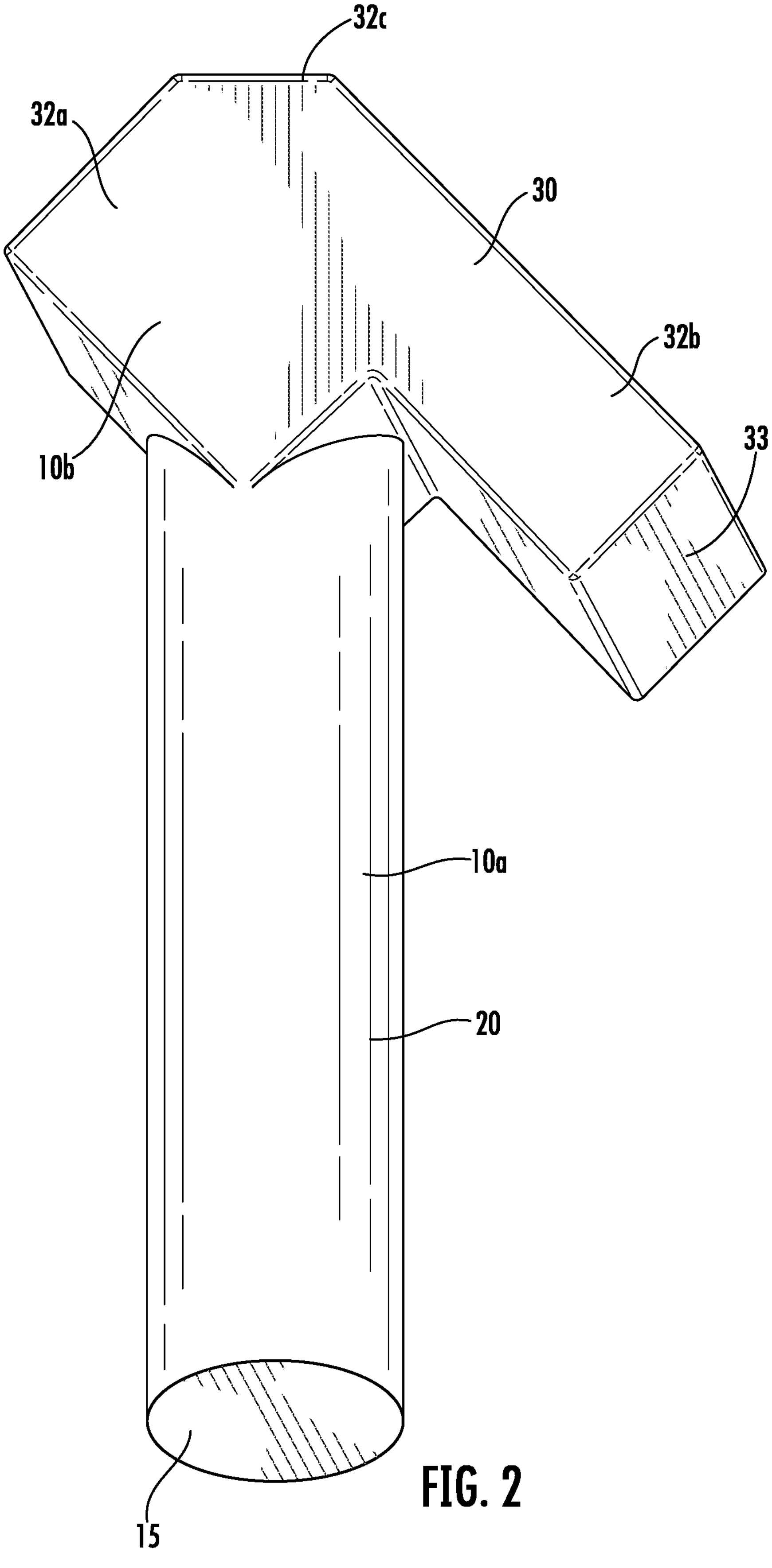
FIG. 2 is another perspective view of the door holding device of FIG. 1.

As shown in FIGS. 1-10B, the present device (indicated by numerals 10, 110, 210, 310, 410, 510) can include a body with a first end 10*a* defining a handle 20, and a second end 10*b* defining a door engagement assembly 30. The door engagement assembly 30 includes a first hinge engagement region 32*a* and a second hinge engagement region 32*b* that are configured to engage with opposing portions or hinge plates 100*a*, 100*b* of a door hinge 100. In one example, the second hinge engagement region 32*b* can also include an abutment region 33 that is configured to engage with a door frame, door jamb, or other structural component. One of ordinary skill in the art would understand that the first hinge engagement region 32*a* could also include an abutment region.

The device 10 can include a bottom surface 15 defined distally relative to the second end 10*b*. A connection region 32*c* can be defined between the first hinge engagement region 32*a* and the second hinge engagement region 32*b*. The connection region 32*c* can be slanted or angled relative to both the first hinge engagement region 32*a* and the second hinge engagement region 32*b*. The connection regions 32*c* can be configured to face towards the knuckles and pin of a door hinge.

Figure 3:
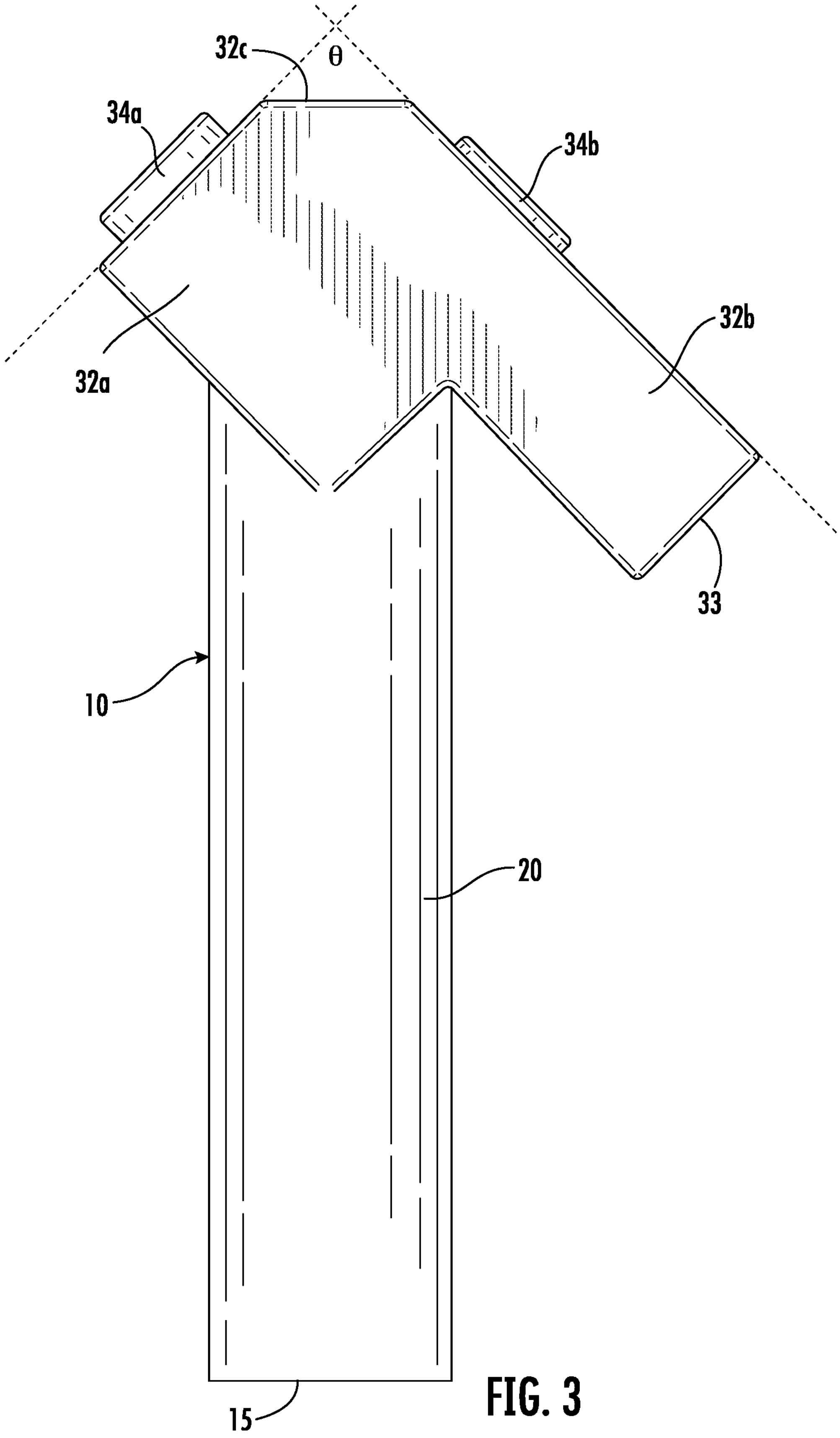
FIG. 3 is a side view of the door holding device of FIG. 1.

As shown in FIG. 3, the first hinge engagement region 32*a* and the second hinge engagement region 32*b* are generally oriented at an angle (θ) relative to each other. In one aspect, the angle (θ) is configured to be approximately 90 degrees. In one aspect, the first hinge engagement region 32*a* and the second hinge engagement region 32*b* are oriented at 70 degrees-110 degrees relative to each other. One of ordinary skill in the art would understand that this orientation can be modified to be suited for a particular doorway or application. Additionally, in one aspect, the device 10 can include an adjustment feature that allows a user to adjust a relative angle between the first hinge engagement region 32*a* and the second hinge engagement region 32*b*.

In one aspect, the first hinge engagement region 32*a* and the second hinge engagement region 32*b* have an identical profile. In another aspect, the first hinge engagement region 32*a* and the second hinge engagement region 32*b* have different shapes or lengths. For example, as shown in the drawings, the second hinge engagement region 32*b* can be longer than the first hinge engagement region 32*a*.

In one aspect, the handle 20 extends perpendicular from an intersection or connection region between the first hinge engagement region 32*a* and the second hinge engagement region 32*b*. The orientation, shape, and profile of the handle 20 can vary. In one aspect, a length of the handle 20 is greater than a length of either one of the first or second hinge engagement regions 32*a*, 32*b*. The handle 20 can have a smooth outer profile for comfort when a user grabs the handle 20 to place it within a hinge region. Grips or other textured features can be applied to the handle 20 for ease of use and gripping.

The first and second hinge engagement regions 32*a*, 32*b* can each include at least one magnetic elements 34*a*, 34*b*. In one aspect, the magnetic elements 34*a*, 34*b* protrude from an outer surface of the first and second hinge engagement regions 32*a*, 32*b*. In another aspect, the magnetic elements 34*a*, 34*b* are recessed from an outer surface of the first and second hinge engagement regions 32*a*, 32*b*. Various configurations for the device are described in more detail herein.

Adjustment features and adjustability elements can be implemented throughout the device 10. For example, a length of the handle 20 can be modified or have a feature that allows users to lengthen and shorten the handle 20. This can be done in order to reduce the profile of the handle 20 once the device 10 is installed and manual engagement with the handle 20 is no longer necessary. In another aspect, a length of at least one of the first or second hinge engagement regions 32*a*, 32*b* can be adjusted.

Figure 4:
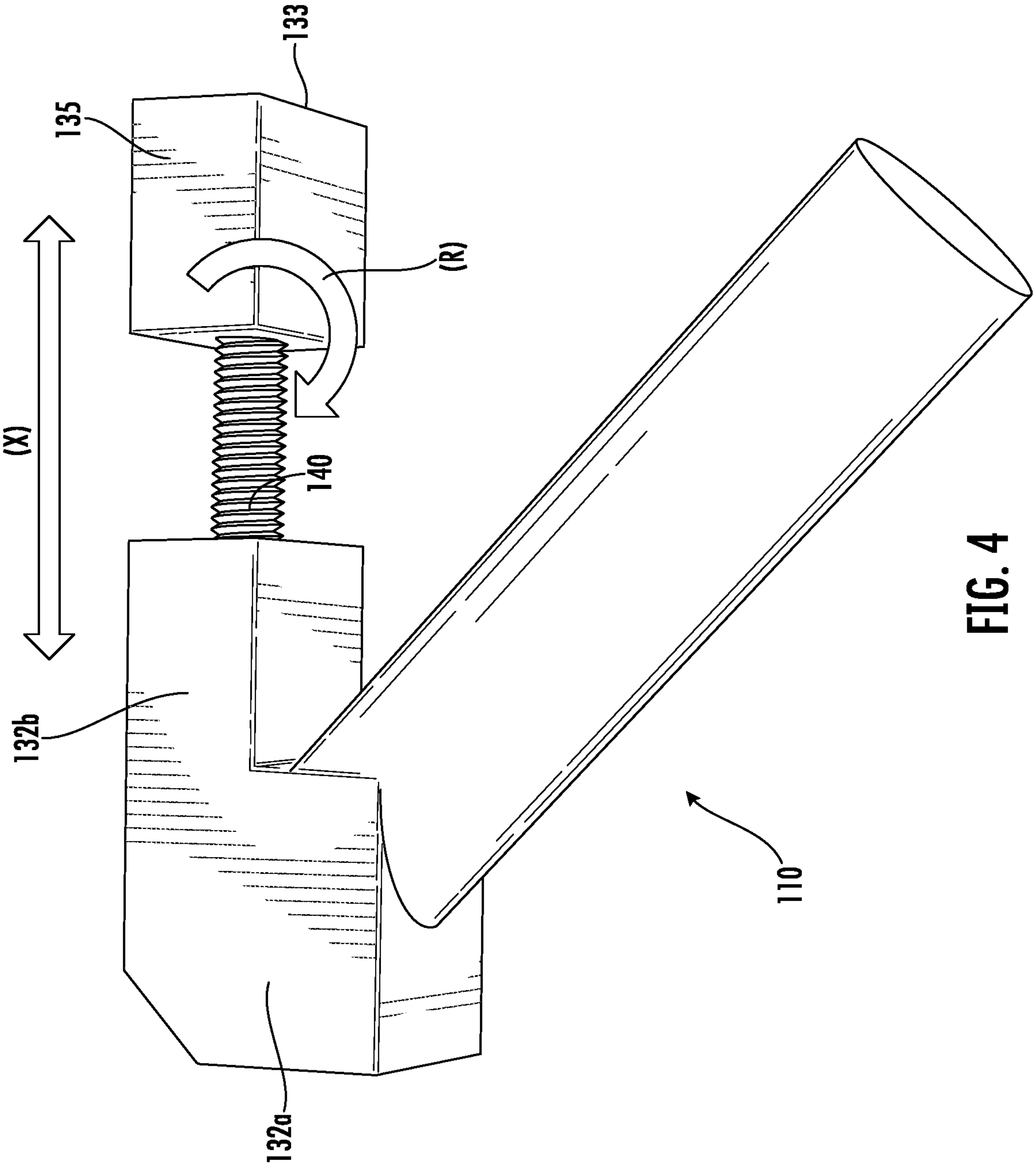
FIG. 4 is a perspective view of a door holding device according to another aspect.
Figure 5:
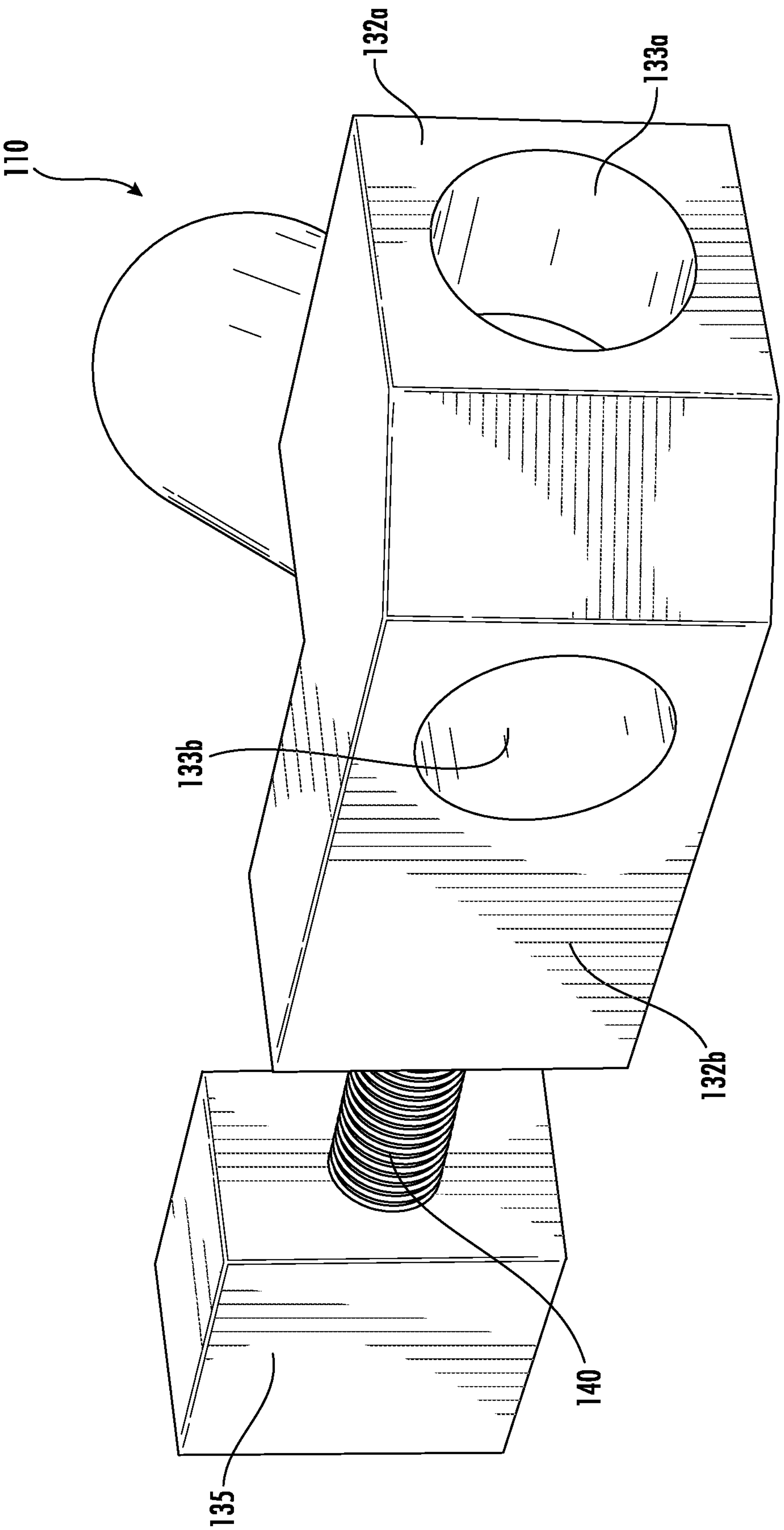
FIG. 5 is a top perspective view of the door holding device of FIG. 4.

A shown in FIGS. 4 and 5, an extension adjustment assembly 140 can be provided that allows for adjustment of the side of the device 110 including the second hinge engagement region 132*b*. As shown in FIGS. 4 and 5, an extension 135 is provided that is connected to the second hinge engagement region 132*b*. In one example, rotation of the extension 135 in the rotational direction (R) causes the extension 135 to either move towards or away (i.e. in direction (X)) from the second hinge engagement region 132*b*. In one aspect, a length of the least one of the first or second hinge engagement regions can be lengthened or shortened by at least 25% of a total length of the first or second hinge engagement regions. In another aspect, the length of one part can be adjusted by 10%-100%. Moving the extension 135 inward or outward can be done by a user to allow the device 110 to fit in doors having a smaller frame or a larger frame such that the device 110 is adaptable to multiple door frame structures. The extension 135 can define the abutment region 133 for the door frame or door jamb. As shown in FIG. 5, pockets 133*a*, 133*b* can be provided for receiving magnetic elements. These pockets 133*a*, 133*b* can be dimensioned such that the magnetic elements sit flush with an outer surface of the hinge engagement regions 132*a*, 132*b*, in one example. The magnetic elements can be secured within the pockets 133*a*, 133*b* via a press fit or interference fit, and/or can be secured via the use of an adhesive or glue substance to retain the magnetic elements with the device.

Figure 6:
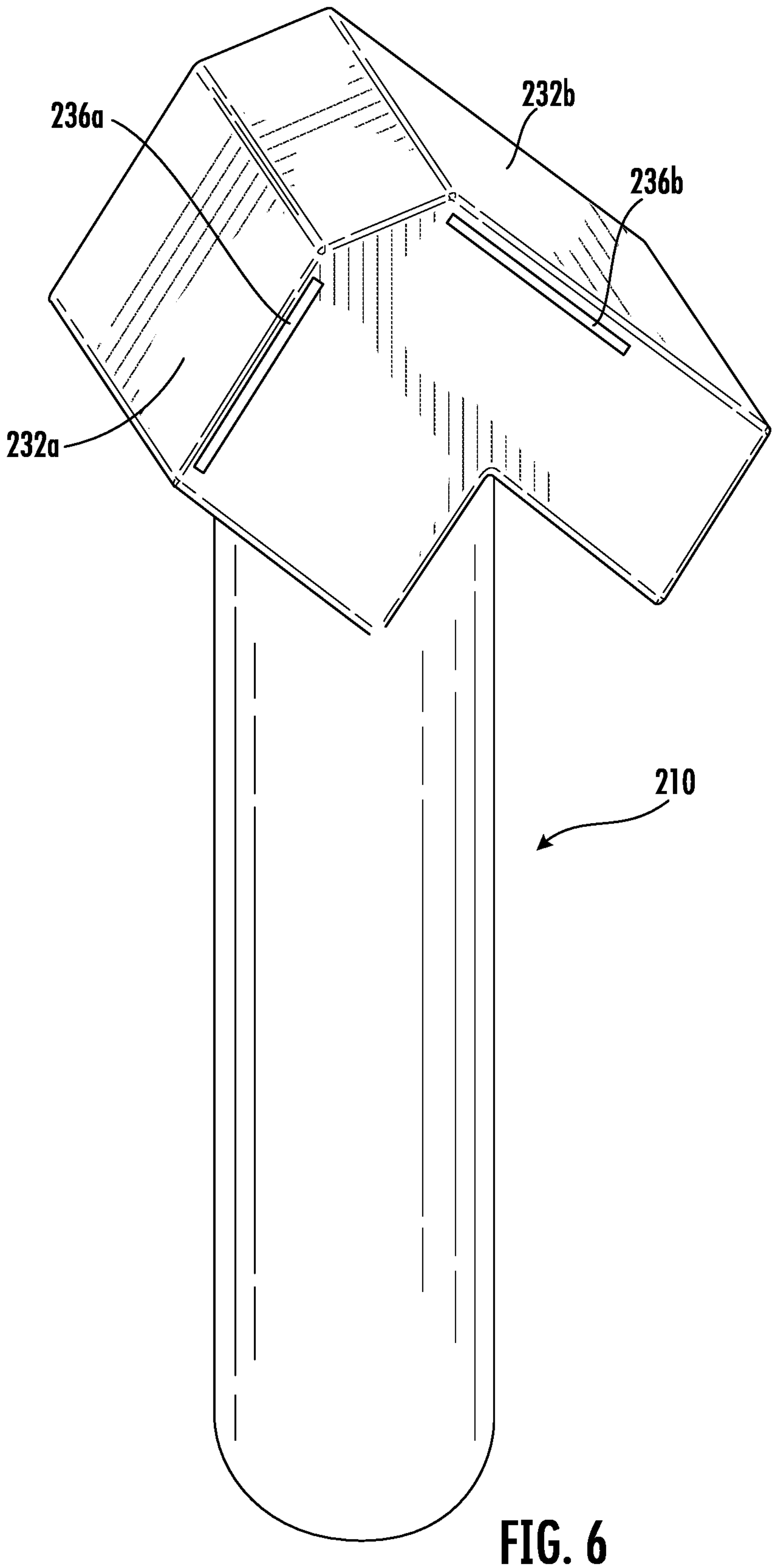
FIG. 6 is a perspective view of a door holding device according to another aspect.

In the configuration shown in FIG. 6, the device 210 can include magnetic elements that are configured to be inserted from a side area through respective slots 236*a*, 236*b* defined on the first and second hinge engagement regions 232*a*, 232*b*.

Figure 7:
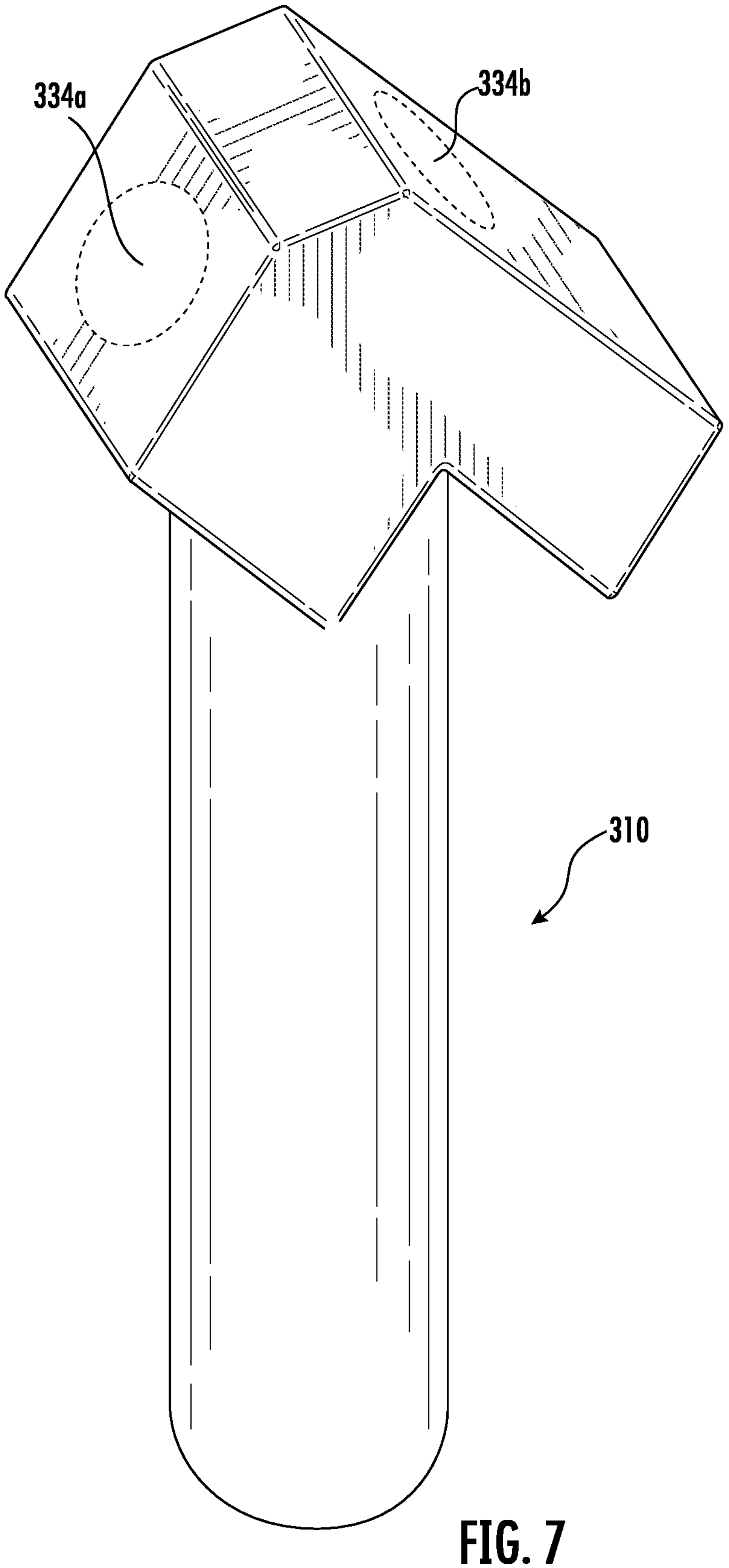
FIG. 7 is a perspective view of a door holding device according to another aspect.

In the configuration shown in FIG. 7, the device 310 can include magnetic elements 334*a*, 334*b* configured to be encased or fully enclosed within the device, as shown by broken lines in FIG. 7. A thickness of the wall of the device in the area of the magnetic elements 334*a*, 334*b* can be of a predefined thickness such that the magnetic elements 334*a*, 334*b* are sufficiently strong enough to still be attracted to the door hinge. The magnetic elements 334*a*, 334*b* are shown in dashed since the magnetic elements 334*a*, 334*b* are not visible from an exterior of the device 310.

Figure 8:
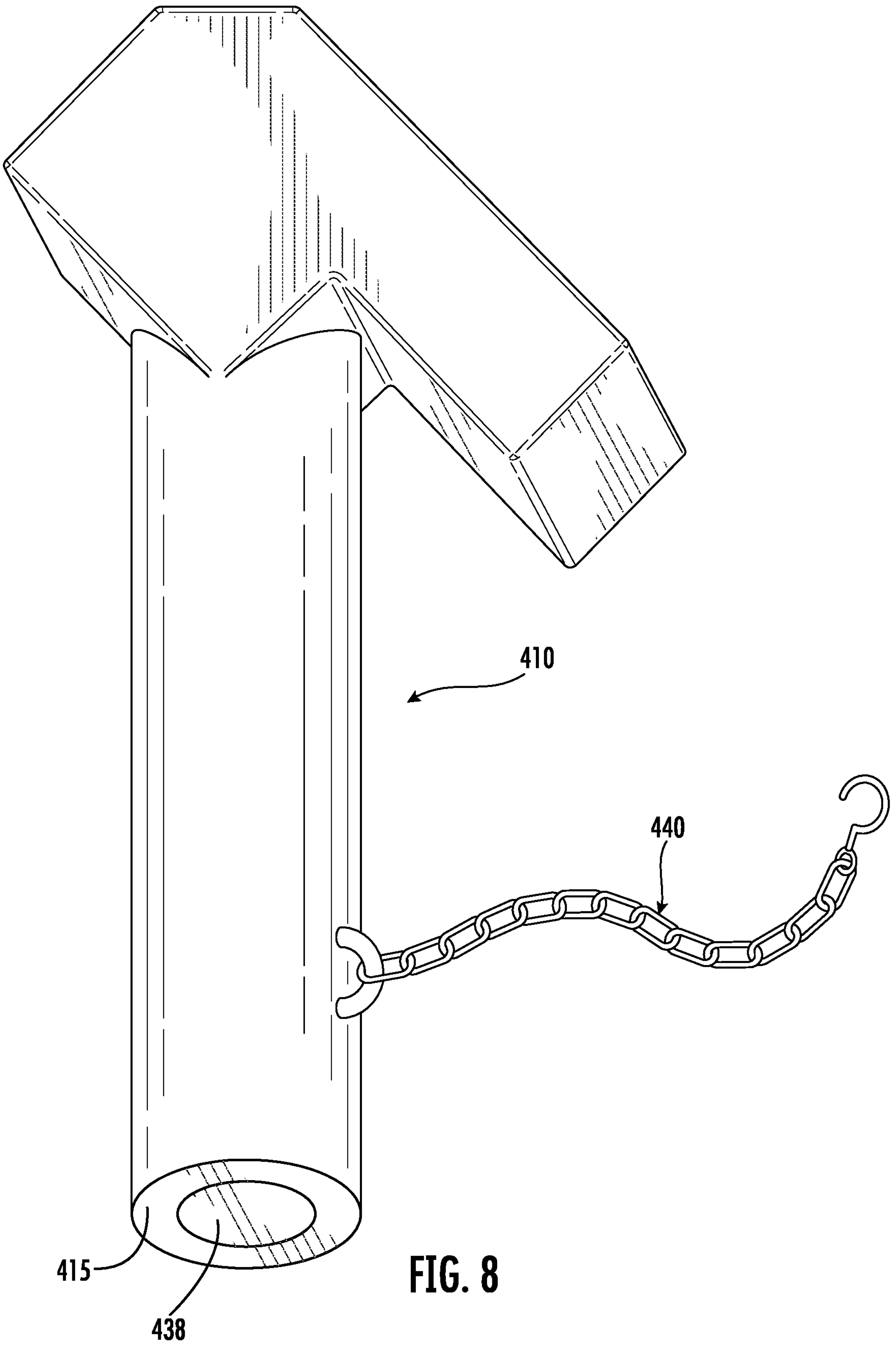
FIG. 8 is a perspective view of a door holding device according to another aspect.

As shown in FIG. 8, the device 410 can include additional features. For example, a bottom surface 415 of the device 410 can include an additional magnetic element 438. In one example, this magnetic element 438 can be used for storing the device 410 in an upright position. As also shown in FIG. 8, the device 410 can include an attachment assembly 440. In one example, the attachment assembly 440 can include a plurality of chains and a hook. The attachment assembly 440 can be configured to latch onto or attach to portions adjacent to a door for storing the device 410. For example, existing doors, particularly in hotels, include a secondary locking assembly which typically includes a chain and a locking component that is configured to engage within a slot. The attachment assembly 440 can be configured to attach to these types of secondary locking assemblies, or other features surrounding a door. In another aspect, the device can include a hole dimensioned to receive a hook or other hanging element such that the device can be stored.

Figure 9A:
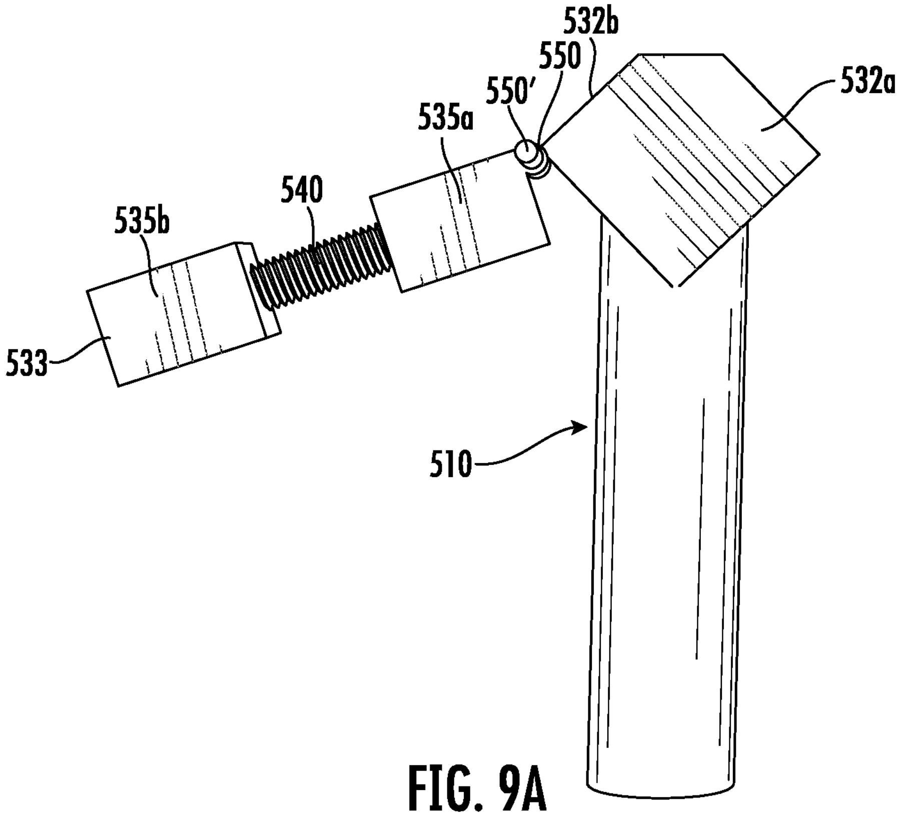
FIG. 9A is a side view of a door holding device according to another aspect.
Figure 9B:
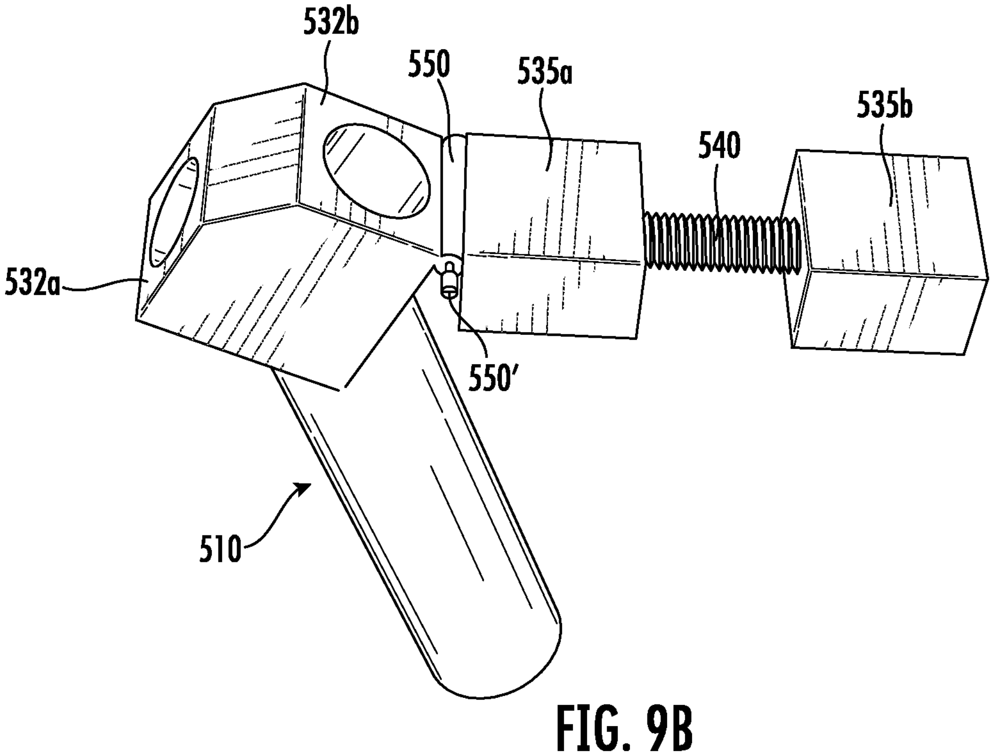
FIG. 9B is a top perspective view of the door holding device of FIG. 9A.

As shown in FIGS. 9A and 9B, the device 510 can include the first and second hinge engagement regions 532*a*, 532*b*, as well as a first extension 535*a* and a second extension 535*b*. An extension adjustment assembly 540 can be arranged between the first extension 535*a* and the second extension 535*b* to adjust a relative spacing between the first extension 535*a* and the second extension 535*b*. The second extension 535*b* can define an abutment region 533 for a door structure, jamb, or element. The extension adjustment assembly 540 can function in a similar manner as the extension adjustment assembly 140.

A hinge adjustment assembly 550 can be arranged between the second hinge engagement region 532*b* and the first extension 535*a*. The hinge adjustment assembly 550 can include a locking assembly 550' that is configured to allow a user to selectively lock and unlock the hinge adjustment assembly 550. In on example, the locking assembly 550' is a knob that is configured to be rotated in a first direction to lock the hinge adjustment assembly 550 in place, and rotated in a second direction to unlock the hinge adjustment assembly 550 and allow relative adjustment between the first extension 535*a* and the first and second hinge engagement regions 532*a*, 532*b*.

The combination of the extension adjustment assembly 540 and the hinge adjustment assembly 550 can be configured to provide at least two degrees of adjustability. The device 510 is thereby configured to be adaptable to various types of door frame structures. The device 510 is illustrated with open pockets for receiving the magnetic elements, but one of ordinary skill in the art would understand that the magnetic elements could be housed internally in the device, inserted into side pockets of the device, or otherwise arranged on the device.

One of ordinary skill in the art would understand that the exact position of the magnetic elements can vary so long as the magnetic elements have a sufficient magnetic attraction to a hinge plate.

The magnetic elements 34*a*, 34*b* can comprise neodymium magnets. One of ordinary skill in the art would understand that various types of magnets could be used. In one aspect, only one magnet is provided on one of the first or second hinge engagement regions 32*a*, 32*b*.

In one aspect, the device 10 is configured to engage with door hinges that are formed from a ferromagnetic material. One of ordinary skill in the art would understand that the device 10 can be modified to engage with other types of hinges and doorways.

In one aspect, the device 10 includes a body that is formed via 3-D printing. The device 10 can be formed from plastic, in one embodiment. In another embodiment, the device 10 can be formed from metal, wood, or any other material. One of ordinary skill in the art would understand that other types of materials and formation methods can be used to form the device 10.

As compared to other fastening or securing elements, such as adhesives, the magnets in the device provide a reliable and re-usable configuration. Repeated use, including removal and installation, does not alter or lessen the ability of the device to hold a door hinge in an open position.

Figure 10B:
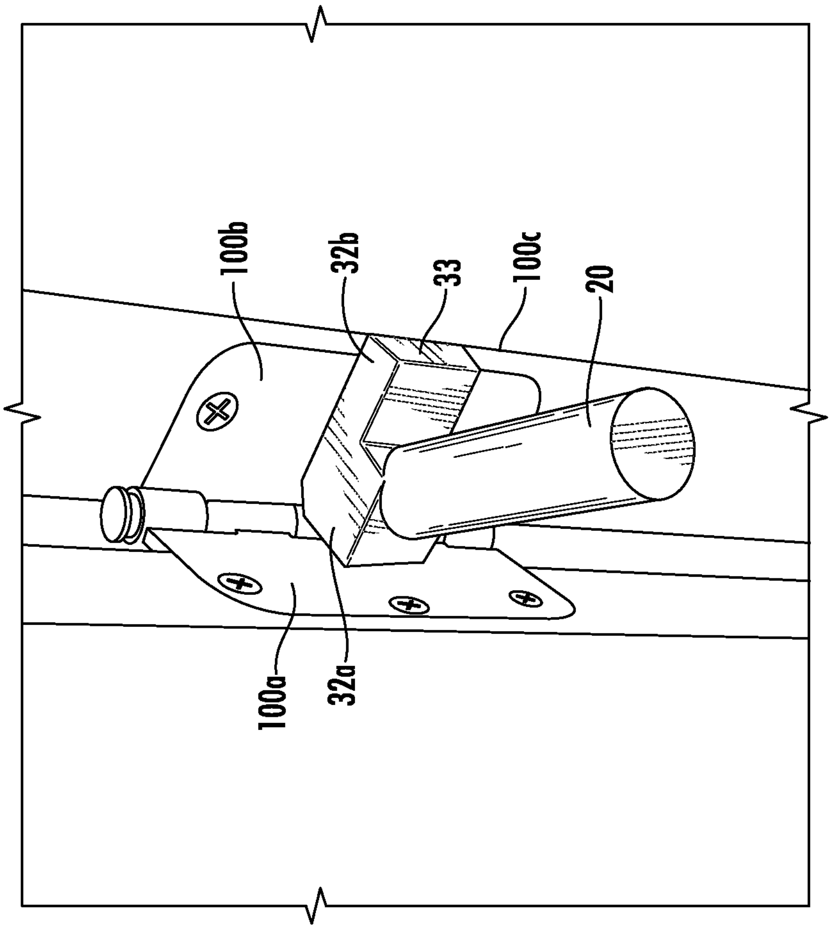
FIG. 10B illustrates the device after installation with the hinge.
Figure 10A:
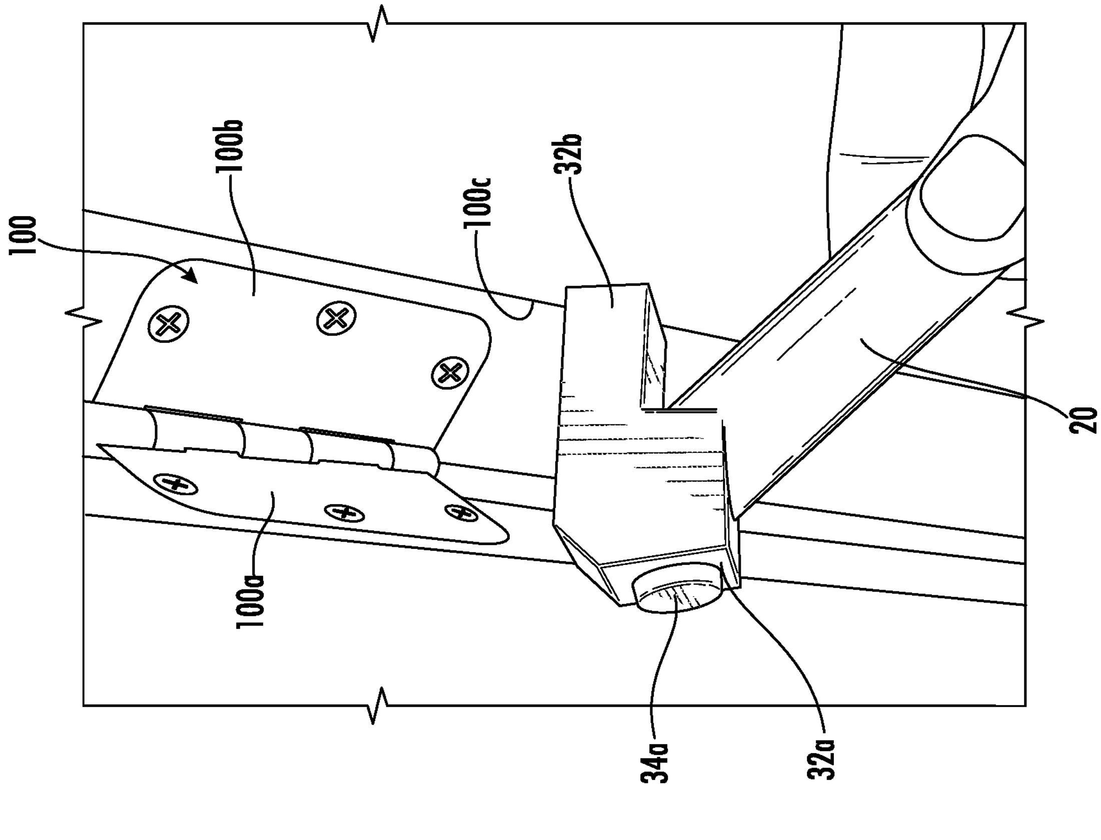
FIG. 10A illustrates the device prior to installation with a hinge.

As shown in FIGS. 10A and 10B, a user can manually engage the handle 20 and place the device 10 onto a hinge 100 such that each of the magnetic elements 34*a*, 34*b* engage with a corresponding one of the hinge plates 100*a*, 100*b*. Once installed, the device 10 holds the door in an open position. FIGS. 10A and 10B also show a door jamb 100*c* (which can also be a door frame, structure, or other component) against which the abutment region 33 of the device 10 is configured to engage. The door is then held in an open configuration based on device pressing against the hinge plate 100*a* attached to the door and the abutment region 33 engaging the door frame or door jamb 100*c*.

Having thus described the present embodiments in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiments and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

What is claimed is:

1. A door holding device comprising:

a first hinge engagement region including at least one first magnetic element;

a second hinge engagement region including at least one second magnetic element, the first hinge engagement region and second hinge engagement region meeting at a substantially flat connection region; and a handle extending in a direction away from the connection region and at an angle with respect to each of the first hinge engagement region and second hinge engagement region, the handle having a length in the direction away from the connection region greater than a length of either one of the first hinge engagement region or second hinge engagement region, wherein the device is configured to hold a door in an open state when the at least one first magnetic element engages a first door hinge plate and the at least one second magnetic element engages a second door hinge plate.

2. The device according to claim 1, wherein the handle has a circular profile.

3. The device according to claim 1, wherein the first and second hinge engagement regions are oriented 70 degrees-110 degrees from each other.

4. The device according to claim 1, wherein the first and second magnetic elements are neodymium magnets.

5. The device according to claim 1, wherein the first and second magnetic elements protrude from the first and second hinge engagement regions.

6. The device according to claim 1, wherein the first and second magnetic elements are recessed from the first and second hinge engagement regions.

7. The device according to claim 1, wherein the device is formed from plastic.

8. The device according to claim 1, wherein the device further comprises at least one adjustment feature configured to adjust a length or orientation of one portion of the device relative to another.

9. The device according to claim 1, wherein a length of the second hinge engagement region is adjustable.

10. The device according to claim 1, wherein the second hinge engagement region defines an abutment region configured to engage against a door jamb.

11. A door holding device comprising:

a first hinge engagement region and a second hinge engagement region, wherein at least one of the first or second hinge engagement regions includes at least one magnetic element, the first hinge engagement region and second hinge engagement region meeting at a connection region having a substantially flat surface, the flat surface of the connection region configured to be positioned adjacent and face a hinge of a door; and a handle extending from a side of the door holding device opposite the flat surface of the connection region, the handle extending in a direction away from the flat surface of the connection region, the handle having a length in the direction away from the connection region greater than a length of either one of the first hinge engagement region or second hinge engagement region, wherein the device is configured to hold the door in an open state when the at least one magnetic element engages a door hinge plate and an abutment region engages against a door jamb.

12. The device according to claim 11, wherein the at least one magnetic element is a neodymium magnet.

13. The device according to claim 11, wherein the first and second hinge engagement regions are oriented 70 degrees-110 degrees from each other.

14. The device according to claim 11, further comprising an extension and an extension adjustment assembly, wherein rotation of the extension relative to the second hinge engagement region causes the extension to move inward or outward from the second hinge engagement region.

15. The device according to claim 11, wherein at least one of the first hinge engagement region or the second hinge engagement region includes a slot on a side surface, and the slot is configured to receive the at least one magnetic element.

16. The device according to claim 11, wherein the least one magnetic element is recessed from the first or second hinge engagement region.

17. The device according to claim 11, further comprising a hinge adjustment assembly arranged between the second hinge engagement region and an extension, wherein a relative angle between the second hinge engagement region and the extension is adjustable.

* * * * *